US006861381B1

(12) United States Patent
Jubb et al.

(10) Patent No.: US 6,861,381 B1
(45) Date of Patent: Mar. 1, 2005

(54) HIGH TEMPERATURE RESISTANT SALINE SOLUBLE FIBRES

(75) Inventors: Gary Anthony Jubb, Stourport-on-Severn (GB); Jean-Louis Martin, Marcellin-en-Forez (FR)

(73) Assignee: The Morgan Crucible Company PLC (GB)

( * ) Notice: Subject to any disclaimer, the term of this patent is extended or adjusted under 35 U.S.C. 154(b) by 16 days.

(21) Appl. No.: 10/070,595

(22) PCT Filed: Aug. 24, 2000

(86) PCT No.: PCT/GB00/03275

§ 371 (c)(1),
(2), (4) Date: Jul. 3, 2002

(87) PCT Pub. No.: WO01/19744

PCT Pub. Date: Mar. 22, 2001

(30) Foreign Application Priority Data

Sep. 10, 1999 (GB) .............................................. 9921504
Oct. 20, 1999 (GB) .............................................. 9924867

(51) Int. Cl.[7] .......................... C03C 13/00; C03C 13/06
(52) U.S. Cl. .......................................... 501/35; 501/36
(58) Field of Search ........................ 501/35, 36, 69–71

(56) References Cited

U.S. PATENT DOCUMENTS

| | | |
|---|---|---|
| 588,493 A | 12/1897 | Hartwig |
| 2,051,279 A | 8/1936 | Thorndyke |
| 2,116,303 A | 5/1938 | Coss |
| 2,155,107 A | 4/1939 | Tyler et al. |
| 2,308,857 A | 1/1943 | Bowes |
| 2,428,810 A | 10/1947 | Powell |
| 2,520,168 A | 8/1950 | Powell |
| 2,520,169 A | 8/1950 | Powell |
| 2,576,312 A | 11/1951 | Minnick |
| 2,577,431 A | 12/1951 | Powell |
| 2,823,416 A | 2/1958 | Powell |
| 3,348,956 A | 10/1967 | Ekdahl |
| 3,449,137 A | 6/1969 | Ekdahl |
| 3,799,836 A | 3/1974 | Rogers et al. |
| 3,835,054 A | 9/1974 | Olewinski et al. |
| 3,887,386 A | 6/1975 | Majumdar |
| 3,969,121 A | 7/1976 | Atkiinson |
| 4,014,704 A | 3/1977 | Miller |
| 4,036,654 A | 7/1977 | Yale et al. |
| 4,041,199 A | 8/1977 | Cartwright |
| 4,047,965 A | 9/1977 | Karst et al. |
| 4,054,472 A | 10/1977 | Kondo et al. |
| 4,055,434 A | 10/1977 | Chen et al. |
| 4,153,439 A | 5/1979 | Tomic et al. |
| 4,205,992 A | 6/1980 | Mogensen et al. |
| 4,238,213 A | 12/1980 | Pallo et al. |
| 4,251,279 A | 2/1981 | Ekdahl |
| 4,274,881 A | 6/1981 | Langton et al. |
| 4,325,724 A | 4/1982 | Froberg |
| 4,342,581 A | 8/1982 | Neubauer et al. |
| 4,351,054 A | 9/1982 | Olds |
| 4,366,251 A | 12/1982 | Rapp |
| 4,377,415 A | 3/1983 | Johnson et al. |
| 4,430,369 A | 2/1984 | Payne |
| 4,437,192 A | 3/1984 | Fujiu et al. |
| 4,443,550 A | 4/1984 | Kume et al. |
| 4,482,541 A | 11/1984 | Telfer et al. |
| 4,555,492 A | 11/1985 | Ekdahl et al. |
| 4,615,988 A | 10/1986 | Le Moigne et al. |
| 4,661,134 A | 4/1987 | Hartung |
| 4,678,659 A | 7/1987 | Drake et al. |
| 4,693,740 A | 9/1987 | Noiret et al. |
| 4,830,989 A * | 5/1989 | Trivedi et al. ................. 501/35 |
| 4,857,489 A | 8/1989 | Bearden |
| 4,873,209 A | 10/1989 | Gnyra |
| 4,957,559 A | 9/1990 | Tiesler et al. |
| 5,032,552 A | 7/1991 | Nonami et al. |
| 5,055,428 A | 10/1991 | Potter |
| 5,108,957 A | 4/1992 | Cohen et al. |
| 5,121,748 A | 6/1992 | Ditz et al. |
| 5,135,893 A | 8/1992 | Dohi et al. |
| 5,217,529 A | 6/1993 | Tiesler et al. |
| 5,248,637 A | 9/1993 | Taneda et al. |
| 5,250,488 A | 10/1993 | Thelohan et al. |
| 5,290,350 A | 3/1994 | Besnard et al. |
| 5,312,806 A | 5/1994 | Mogensen |
| 5,332,699 A | 7/1994 | Olds et al. |
| 5,346,868 A | 9/1994 | Eschner |
| 5,401,693 A | 3/1995 | Bauer |
| 5,407,872 A | 4/1995 | Komori et al. |
| 5,552,213 A | 9/1996 | Eschner et al. |
| 5,583,080 A | 12/1996 | Goldberg et al. |
| 5,614,449 A | 3/1997 | Jensen |
| RE35,557 E | 7/1997 | Thelohan et al. |
| 5,691,255 A | 11/1997 | Jensen et al. |
| 5,714,421 A | 2/1998 | Olds et al. |
| 5,811,360 A | 9/1998 | Jubb |
| 5,821,183 A | 10/1998 | Jubb |
| 5,843,854 A | 12/1998 | Karppinen et al. |
| 5,880,046 A | 3/1999 | Delvaux et al. |

(List continued on next page.)

FOREIGN PATENT DOCUMENTS

| | | |
|---|---|---|
| AU | 255803 | 7/1963 |
| CA | 2017344 | 11/1990 |

(List continued on next page.)

OTHER PUBLICATIONS

Derwent Abstract 1976–21492X, Abstract of JP 51–013819.*

(List continued on next page.)

Primary Examiner—Karl Group
Assistant Examiner—Elizabeth A. Bolden
(74) Attorney, Agent, or Firm—Bruce D. Gray; Dean W. Russell; KilpatrickStockton LLP

(57) ABSTRACT

A fibre is disclosed having a maximum use temperature of 1200° C. or more which comprises: $SiO_2 > 64.25$ wt % $CaO > 18$ wt % $MgO < 17$ wt % and in which the amount of MgO in mol % is greater than the amount of CaO in mol %. Such fibers have high solubility and low dustiness.

13 Claims, 3 Drawing Sheets

U.S. PATENT DOCUMENTS

| | | |
|---|---|---|
| 5,912,201 A | 6/1999 | Couture et al. |
| 5,928,975 A | 7/1999 | Jubb |
| 5,955,389 A | 9/1999 | Jubb |
| 5,994,247 A | 11/1999 | Jubb et al. |
| 5,998,315 A | 12/1999 | Jubb |
| 6,037,284 A | 3/2000 | Holstein et al. |
| 6,043,172 A | 3/2000 | Hart |
| 6,043,173 A | 3/2000 | Hart |
| 6,060,414 A | 5/2000 | Holstein et al. |
| 6,180,546 B1 | 1/2001 | Jubb et al. |
| 6,214,102 B1 | 4/2001 | Vandermeer |
| 6,287,994 B1 | 9/2001 | Hart |
| 6,358,872 B1 * | 3/2002 | Karppinen et al. ........... 501/36 |

FOREIGN PATENT DOCUMENTS

| | | |
|---|---|---|
| DE | 1 94 2 991 | 3/1970 |
| DE | 27 48 127 | 5/1978 |
| DE | 2732 387 | 11/1978 |
| DE | 34 44 397 A1 | 6/1986 |
| DE | 39 05 394 C2 | 9/1989 |
| DE | 44 17 230 A1 | 11/1995 |
| DE | 44 17 231 A1 | 11/1995 |
| DE | 44 21 120 A1 | 12/1995 |
| DE | 44 47 576 A1 | 5/1996 |
| DE | 44 47 577 A1 | 5/1996 |
| EP | 0 019 600 A3 | 11/1980 |
| EP | 0 076 677 A1 | 4/1983 |
| EP | 0 091 866 A1 | 10/1983 |
| EP | 0 135 449 A1 | 3/1985 |
| EP | 0 144 349 B1 | 6/1985 |
| EP | 0 399 320 A1 | 11/1990 |
| EP | 0 399 652 A1 | 11/1990 |
| EP | 0 412 878 A1 | 2/1991 |
| EP | 0 459 897 A1 | 12/1991 |
| EP | 0 546 984 A1 | 6/1993 |
| EP | 0 585 547 A1 | 3/1994 |
| EP | 0 586 797 A1 | 3/1994 |
| EP | 0 588 251 A1 | 3/1994 |
| EP | 0 591 696 A1 | 4/1994 |
| EP | 0 685 434 B1 | 12/1995 |
| EP | 0 710 628 A2 | 5/1996 |
| EP | 0 936 199 A2 | 8/1999 |
| EP | 0 115 673 B1 | 7/2001 |
| FI | 63007 | 12/1982 |
| FR | 1 149 289 | 12/1957 |
| FR | 1 165 275 | 10/1958 |
| FR | 1 589 410 | 3/1970 |
| FR | 2 118 026 | 7/1972 |
| FR | 2 662 687 | 12/1991 |
| FR | 2 662 688 | 12/1991 |
| GB | 520247 | 4/1940 |
| GB | 790397 | 2/1958 |
| GB | 810773 | 3/1959 |
| GB | 1 045 848 | 10/1966 |
| GB | 1 204 472 | 9/1970 |
| GB | 1 209 244 | 10/1970 |
| GB | 1 273 205 | 5/1972 |
| GB | 1 399 556 | 7/1975 |
| GB | 1 446 910 | 8/1976 |
| GB | 1 462 173 | 1/1977 |
| GB | 1 473 908 | 5/1977 |
| GB | 1 532 612 | 11/1978 |
| GB | 2 011 379 B | 7/1979 |
| GB | 2 081 703 A | 2/1982 |
| GB | 2 083 017 A | 3/1982 |
| GB | 2 122 537 A | 1/1984 |
| GB | 2 150 553 A | 7/1985 |
| GB | 2 164 557 A | 3/1986 |
| GB | 2 259 700 A | 3/1993 |
| JP | 49-27620 | 3/1974 |
| JP | 51-13819 | 2/1976 |
| JP | 51-43429 A | 4/1976 |
| JP | 51-133311 | 11/1976 |
| JP | 52-4519 | 1/1977 |
| JP | 52-139113 | 11/1977 |
| JP | 56-54252 | 5/1981 |
| SE | 104380 | 4/1942 |
| SU | 27649 | 7/1970 |
| SU | 259337 | 8/1970 |
| SU | 607807 | 5/1978 |
| WO | WO 85/02394 | 6/1985 |
| WO | WO 86/04807 | 8/1986 |
| WO | WO 87/05007 | 8/1987 |
| WO | WO 89/12032 | 12/1989 |
| WO | WO 90/02713 | 3/1990 |
| WO | WO 90/11756 | 10/1990 |
| WO | WO 91/11403 | 8/1991 |
| WO | WO 92/07801 | 5/1992 |
| WO | WO 92/09536 | 6/1992 |
| WO | WO 93/15028 | 8/1993 |
| WO | WO 93/15208 | 8/1993 |
| WO | WO 93/19596 | 10/1993 |
| WO | WO 93/22251 | 11/1993 |
| WO | WO 94/14717 | 7/1994 |
| WO | WO 94/14718 | 7/1994 |
| WO | WO 94/15883 | 7/1994 |
| WO | WO 94/23801 | 10/1994 |
| WO | WO 95/21799 | 8/1995 |
| WO | WO 95/29135 | 11/1995 |
| WO | WO 95/31410 | 11/1995 |
| WO | WO 95/31411 | 11/1995 |
| WO | WO 95/32925 | 12/1995 |
| WO | WO 95/32926 | 12/1995 |
| WO | WO 95/32927 | 12/1995 |
| WO | WO 95/35265 | 12/1995 |
| WO | WO 96/01793 | 1/1996 |
| WO | WO 96/02478 | 2/1996 |
| WO | WO 96/04213 | 2/1996 |
| WO | WO 96/04214 | 2/1996 |
| WO | WO 96/14274 | 5/1996 |
| WO | WO 96/16913 | 6/1996 |
| WO | WO 96/30314 | 10/1996 |
| WO | WO 97/16386 | 5/1997 |
| WO | WO 97/20782 | 6/1997 |
| WO | WO 97/ 21636 | 6/1997 |
| WO | WO 97/29057 | 8/1997 |
| WO | WO 97/30002 | 8/1997 |
| WO | WO 97/49643 | 12/1997 |
| WO | WO 98/02394 | 1/1998 |

OTHER PUBLICATIONS

Thermal Ceramics Product Information for Superwool® Blanket, 2 pages, Mar. 1991.

Thermal Ceramics Brochure entitled "Innovative Solutions for Heat–Intensive Problems," SF 607™ Blanket, SF 607™ Paper (04/92), 7 pages.

Brochure showing Manville Corporation entitled "Insulating Fiber Products" for New Superwool™ Product (two pages, undated).

Thermal Ceramics Protocol Information Brochure entitled Superwool Blanket (Grade X–607), 2 pages (undated).

Brochure by Carborundum Company entitled Insulfrax$^R$ Specialty Glass Fiber Product Specification, 8 pages (03/93).

Brochure by Paraisten Kaikki Oy entitled Hohe Temperaturen? Großer Wärmeverlust? PARGAS–Platten 1000° C., 3 pages (undated).

"Fiber Glass," J. Mohr and W. Rowe, Table of Contents and pp. 4–27 (Van Nostrand Reinhold Company) (undated).

"Prediction of Glass Durability as a Function of Glass Composition and Test Conditions:Thermodynamics and Kinetics," C.M. Jantzen, *Advances in the fusion of Glass*, pp. 24.1–24.17 (undated).

"Stability of Radioactive Waste Glasses Assessed from Hydration Thermodynamics," M.J. Plodinec, C.M. Jantzen, and G.G. Wicks, pp. 755–758 (undated).

"Nuclear Waste Glass Durability: I, Predicting Environmental Response from Thermodynamic (Pourbaix) Diagrams," Carol M. Jantzen, *Journal of American Ceramic Society*, 75(9):2433–2448 (1992).

"Calcium Aluminate Glass Fibers: Drawing from Supercooled Melts Versus Inviscid Melt Spinning," F.T. Wallenberger et al., *Materials Letters,*, 11:229–235 (1991).

"Chemical Durability of Glass," *Chemistry of Glasses*, Chapter 6, 2nd Edition, A. Paul, pp. 179–218 (Chapman and Hall) (1990).

*Chemical Abstracts*, 110(10):373, Abstract No. 81274g (equivalent to CN–A–87 108257) (1989).

"Low–Cost Reinforcing Fibers Promise a High Level of Performance," S.A. Dunn, *Modern Plastic International*, pp. 50–51 (Jun. 1989).

"The Behaviour of Mineral Fibres in Physiological Solutions," H. Förster, *Proceedings of 1982 WHO IARC Conference*, Copenhagen, vol. 2, pp. 27–55 (1988).

"Chemical Durability," *Glass Science and Technology*, Chapter 34, pp. 377–388 (Elsevier) (1988).

"Glass–Water Interactions," H. Scholze, *Journal of Non–Crystalline Solids*, 102:1–10 (1988).

"The Reactions of MMMF in a Physiological Model Fluid and in Water," R. Klingholz & B. Steinkopf, *Proceedings of 1982 WHO IARC Conference*, Copenhagen, vol. 2, pp. 61–86 (1988).

"Solubility and Durability of Manmade Mineral Fibers in Physiological Fluids," J. Bauer, et al., (nineteen pages; dated no later than 1988).

Standard Test Methods for Fire Tests of Building Construction and Materials, ASTM Designation: E119–88, pp. 1–21 (1988).

"An In Vitro Study of the Chemical Durability of Siliceous Fibres," H. Scholze & R. Conradt, *Annals of Occupational Hygiene*, 31:48, pp. 683–692 (1987).

"In vitro Study on Siliceous Fibres," H. Scholze & R. Conradt, *Proceedings of 1986 WHO IARC Conference*, 25 pages (1986).

"Chemical Durability of Asbestos and of Man–made Mineral Fibres in vivo," B. Bellman et al., *Aerosol Scientist*, vol. 17(3):341–345 (1986).

"Prediction of Nuclear Waste Glass Durability from Natural Analogs," C.M. Jantzen, *Advances in Ceramics*, vol. 20, 10 pages, Nuclear Waste Management II (1986).

"Thermodynamic Model of Natural, Medieval and Nuclear Waste Glass Durability," C.M. Jantzen et al., *Journal of Non–Crystalline Solids*, 67:207–233 (1984).

"A New Approach to Predicting the Durability of Glasses from Their Chemical Compositions," R.G. Newton and A. Paul, *Glass Technology*, 21(6):307–309 (Dec. 1980).

"Inviscid Spinning of Filaments via Chemical Jet Stabilization," R.E. Cunningham, L.F. Rakestraw and S.A. Dunn, *The American Institute of Chemical Engineers Symposium Series*, No. 180, vol. 74:20–31 (1978).

"Chemical Durability of Glasses in the Systems $SiO_2$–CaO–$Na_2O$–$R_mO_n$," H. Ohta and Y. Suzuki, *Ceramic Bulletin*, vol. 57(6):602–604 (1978).

"A Scale of Acidity and Basicity in Glass," The Glass Industry, Kuan–Han Sun, pp. 73–74 (Feb. 1948).

"Mineral Wool," by J.R. Thoenen, *Encyclopedia of Chemical Technology*, Kirk & Othmer, vol. 9:122–132 (The Interscience Encyclopedia, Inc., New York (copyright 1952).

"Mineral Wool," U.S. Bureau of Mines Information Circular I.C. 6984R, pp. 1–62 (Jun. 1939).

"Slag Wools," *Inorganic Fibres*, pp. 111–127 (undated).

"Preparation and Properties of Barium Ferrite Using Hot–Rolled Mill Scale," Chien, Yung–Tsen, et al., *J. Am. Ceram. Soc.*, vol. 72(8):1328–1332 (1989).

"The Dissolution of Asbestos Fibres in Water," Grono, J., *Clay Materials*, vol. 22:21–35 (1987).

"Man–Made Vitreous Fibers: An Overview of Studies on Their Biologic Effects," Gross, P., *Am. Ind. Hyg. Assoc. J.*, vol. 47(11):717–723 (Nov. 1986).

"Solubility of Asbestos and Man–Made Fibers In Vitro and In Vivo: Its Significance in Lung Disease," Morgan, A., et al., *Environmental Research*, vol. 39:475–484 (1986).

"Corrosion Phenomena in Glass Fibers and Glass Fiber Reinforced Thermosetting Resins," Bledzki, A. et al., *Composites Science & Technology,*, (Harris and Chou, eds., Elsevier Applied Science Publishers), vol. 23:263–285 (1985).

"Fiber Toxicology," Leineweber, J.P., *J. Occupational Medicine*, vol. 23(6):431–434 (Jun. 1981).

"Development of a Deoiling Process for Recycling Millscale," *Recycling in the Steel Industry, Proceedings of the 1st Process Technology Conference*, vol. 1:184–187, Washington, D.C., (Mar. 25–26, 1980).

"Effects of Glass Surface Area to Solution Volume Ration on Glass Corrosion," Ethridge, E.C. et al., *Physics and Chemistry of Glasses*, vol. 20(2):35–40 (Apr. 1979).

"Glass Compositions for Glass Fibers," Moriya, Ichiro, et al., *Chemical Abstracts*, vol. 89, p. 285, Abstract 89:184615w (1978).

"Glass for Making Glass Fiber," Grigor'ev, V.S., et al., *Chemical Abstracts*, vol. 81, Abstract 140076b (1974).

"Dissolution Kinetics of Magnesium Silicates," Luce, R.W., et al., *Geochimica et Cosmochimica Acta.*, vol. 36, pp. 35–50 (1972).

"Solubility of Fibres In Vitro and in Vivo," J.P. Leinweber, Proceedings of 1982 WHO IARC Conference, Copenhagen, vol. 2:87–101 (1988).

"*Elements of Ceramics*," Norton, F. H., (Addison–Wesley Publishing Co., Inc. Reading, Massachusetts, P. 39 (1952).

Carlock, D.E., "Ceramic Fibres," *Refractories Journal*, 58:17–20 (1983).

Dietrichs & Kronert, *Gas Warme International*, vol. 30, Issue No. 7/8 (Jul./Aug. 1981).

Ofentechnik Stahl & Eisen, "Furnace technology . . . Heat and Energy," 110(6):115 (Jun. 1990).

Keramishe Zeitschriften, 33(9):516 (1981).

Extract from ENV 1094, Part 7, section 7, 9–12 (1993).

Database WPIL Section Ch. Week 8218, 82–365551E (equivalent to JP–B–57016938 (undated).

"Multicomponent Silicate Glasses," *Molecular Structure*, pp. 28–31 (undated).

Carborundum Product Information Brochure for Insulfrax® Blanket, 2 pages (Apr. 1992).

WPI Abstract Accession No. 93–285586 and JP5202352 (Aug. 10, 1993).

WPI Abstract Accession No. 87–154127 and JP62091545 (Apr. 27, 1987).

WPI Abstract Accession No. 81–26226D and JP56016578 (Feb. 17, 1981).

Insulcon Technical Datasheet entitled ("Refractory Fiber Products" (seven pages, 11/92).

Klinger, et al., "Recent developments in high–temperature heat–insulating materials of ceramic fibre," Conference Proceedings from 7$^{th}$ Duisburger Warmedammtagen (Thermal Insulation Conference) Mar. 12, 13, 1997 (pp. 1–13) and its English translation.

Guyadec and Persson, "Inorganic Binders for High Temperatures Vacuum Forming of Ceramic Fibres," *Universite Joseph Fourier*, Grenoble, France, 1992 Eka Nobel AB (pp. 1–29).

Applications of Nalco® Colloidal Silicas, Nalco Chemical Company, May 1994, one page.

Brochure from Akzo–PQ Silica Amersfoort, Netherlands, 1993 (pp. 4 and 5) and its English translation.

Safety Data Sheet "Carbowool HT Products," by Carborundum Deutschland GmbH, May 28, 1998 (pp. 1–9) and its English translation.

Extract from two volume Brockhaus ABC Chemie, vol. 1 A–K, p. 672, 1971 relating to term Silica gel, Gelatinous silica and its English translation.

* cited by examiner

HIGH TEMPERATURE RESISTANT SALINE SOLUBLE FIBRES

This application claims priority to Great Britain Application No. 9921504.8 filed on Sep. 10, 1999 and Great Britain Application No. 9924867.6 filed on Oct. 20, 1999 and International Application No. PCT/GB00/03275 filed on Aug. 24, 2000 and published in English as International Publication Number WO01/19744 A1 on Mar. 23, 2001, the entire contents of which are hereby incorporated by reference.

This invention relates to high temperature resistant saline soluble fibres and particularly relates to calcium-magnesium-silicate fibres.

Calcium-magnesium-silicate fibres are known for example from WO89/12032, WO93/15028 and WO94/15883.

WO89/12032 first disclosed a broad class of fire-resistant saline soluble fibres.

WO93/15028 showed that a class of the fibres of WO89/12032 were usable at temperatures up to 1000° C. or more.

WO94/15883 showed that some of the fibres of WO93/15028 had higher use temperatures still, of up to 1260° C. or more, and indicated that such fibres needed a $SiO_2$ excess (defined as the amount of $SiO_2$ remaining after crystallisation of CaO, MgO and any $ZrO_2$ as silicates) of greater than 21.8 mol %.

WO97/16386 while falling in the general class of calcium-magnesium-silicate fibres looked to low calcium fibres to show use temperatures of 1260° C. or more.

It is apparent that there are regions of the CaO—MgO—$SiO_2$ and CaO—MgO—$SiO_2$—$ZrO_2$ composition fields within which high temperature performance fibres can be made and other regions where they cannot The applicants have now found a new and narrow range of compositions that are usable at temperatures of 1200° C. or more and even 1250° C. or 1260° C. or more, and yet fall outside the scope of WO94/15883 and WO97/16386. These compositions preferably have little or no zirconia.

Accordingly the present invention provides a fibre having a maximum use temperature of 1200° C. or more in which the amount of MgO in mol % is greater than the amount of CaO in mol % and which comprises:—

$SiO_2$ > 64.25 wt %

CaO > 18 wt %

MgO < 17 wt %.

However, no claim is made to fibres having a $SiO_2$ excess as specified of greater than 21.8 mol %.

Further features of the invention are apparent from the appended claims.

The excess $SiO_2$ figure is calculated by treating all of the CaO as being bound as $CaO.MgO.2SiO_2$; all of the $ZrO_2$ as being bound as $ZrO_2.SiO_2$; and the remaining as being bound as $MgO.SiO_2$. The applicants also assume that any $Al_2O_3$ crystallises as $Al_2O_3.SiO_2$. Any remaining $SiO_2$ is called the excess $SiO_2$.

The invention is illustrated by way of example in the following description with reference to the drawings in which FIG. 1 is a graph showing linear shrinkage with temperature for blankets comprising the fibres A4-2 and A4-3 of Table 1 below.

Figure 1:
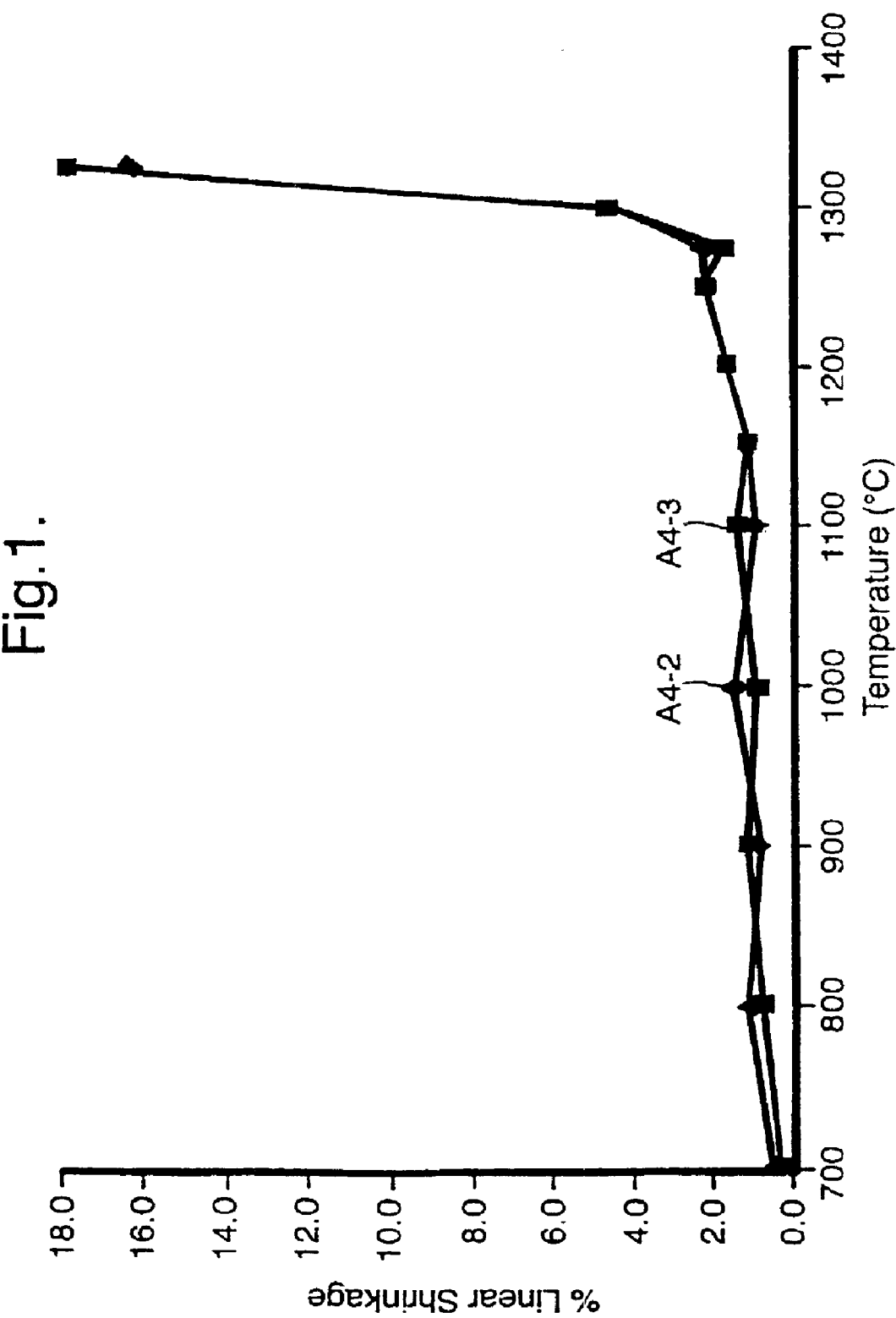

Table 1 shows compositions extracted from WO89/12032, WO93/15028, WO94/15883, and WO97/16386 together with A4, a target composition fibre having the composition:—

$SiO_2$ 65 wt %

CaO 19.5 wt %

MgO 15.5 wt % and A4-1, A4-2, and A4-3, which are analysed fibre samples.

The fibres extracted from the data of WO89/12032 (referred to as Manville fibres), WO93/15028, WO94/15883, and WO97/16386 (referred to as Unifrax fibres) are those for which the $SiO_2$ excesses as specified is less than than 21.8 mol % and for which the amount of MgO in mol % is greater than the amount of CaO in mol %.

A4-1 was produced as bulk fibre; A4-2 was produced as needled blanket having a density of approximately 96 kg.m$^{-3}$; and A4-3 was produced as needled blanket having a density of approximately 128 kg.m$^{-3}$.

In Table 1 shrinkages are indicated from the documents concerned or, for A4-1, A4-2, and A4-3, from measuring the shrinkage of vacuum formed preforms of the fibres concerned.

TABLE 1

| Fibre | Shrinkage at 1260° C. | Composition wt % | | | | | | | Composition mol % | | | | | | $SiO_2$ Excess |
|---|---|---|---|---|---|---|---|---|---|---|---|---|---|---|---|
| | | CaO | MgO | $ZrO_2$ | $Al_2O_3$ | $TiO_2$ | $SiO_2$ | Others | CaO | MgO | $ZrO_2$ | $Al_2O_3$ | $TiO_2$ | $SiO_2$ | |
| 924 | | 19.78 | 14.54 | 0.66 | 2.57 | | 61.32 | | 19.99 | 20.44 | 0.30 | 1.43 | | 57.84 | 15.68 |
| SW-A1 | | 20.50 | 15.20 | | 1.10 | | 63.70 | | 20.16 | 20.79 | 0.00 | 0.59 | | 58.46 | 16.92 |
| B5 | 6.00 | 19.90 | 15.10 | 0.10 | 0.20 | | 64.20 | 0.40 | 19.71 | 20.80 | 0.05 | 0.11 | | 59.34 | 18.68 |
| 757 | | 20.92 | 15.22 | 0.00 | 0.20 | | 62.60 | | 20.79 | 21.04 | 0.00 | 0.11 | | 58.06 | 16.13 |
| A4-1 | 1.86 | 20.20 | 15.50 | | 0.26 | | 64.60 | 0.07 | 19.76 | 21.10 | 0.00 | 0.14 | | 59.00 | 18.00 |
| A4-2 | 3.25 | 20.20 | 15.50 | | 0.30 | | 64.50 | 0.06 | 19.78 | 21.11 | 0.00 | 0.16 | | 58.95 | 17.89 |
| A4-3 | 2.76 | 20.20 | 15.60 | | 0.28 | | 64.70 | 0.07 | 19.72 | 21.18 | 0.00 | 0.15 | | 58.95 | 17.9 |
| A4 target | | 19.50 | 15.50 | | | | 65.00 | | 19.17 | 21.20 | 0.00 | 0.00 | | 59.64 | 19.27 |
| SW-A2 | | 21.40 | 15.40 | | 0.80 | | 60.80 | | 21.40 | 21.42 | 0.00 | 0.44 | | 56.74 | 13.49 |
| SW-A | | 20.50 | 15.50 | | 3.30 | | 59.30 | | 20.66 | 21.73 | 0.00 | 1.83 | | 55.78 | 11.56 |
| 932 | | 21.60 | 15.65 | 0.11 | 1.50 | | 59.85 | | 21.58 | 21.75 | 0.05 | 0.82 | | 55.80 | 11.60 |
| Manville104 | | 17.70 | 16.30 | | 1.83 | | 64.10 | | 17.49 | 22.40 | 0.00 | 0.99 | 0.00 | 59.11 | 18.23 |
| B9 | 5.00 | 18.10 | 17.10 | 0.10 | 0.20 | | 64.40 | 0.20 | 17.72 | 23.29 | 0.04 | 0.11 | | 58.84 | 17.69 |
| 971 | | 23.92 | 17.36 | 0.05 | 0.74 | | 56.82 | | 23.56 | 23.79 | 0.02 | 0.40 | | 52.23 | 4.47 |
| B8 | 6.90 | 18.80 | 17.90 | 0.30 | 0.20 | | 63.00 | 0.20 | 18.30 | 24.24 | 0.13 | 0.11 | | 57.23 | 14.46 |
| B16 | 4.30 | 15.10 | 18.10 | 0.30 | 0.10 | 0.10 | 66.00 | 0.20 | 14.78 | 24.65 | 0.13 | 0.05 | 0.07 | 60.31 | 20.69 |

TABLE 1-continued

| Fibre | Shrinkage at 1260° C. | Composition wt % | | | | | | | Composition mol % | | | | | | SiO$_2$ Excess |
|---|---|---|---|---|---|---|---|---|---|---|---|---|---|---|---|
| | | CaO | MgO | ZrO$_2$ | Al$_2$O$_3$ | TiO$_2$ | SiO$_2$ | Others | CaO | MgO | ZrO$_2$ | Al$_2$O$_3$ | TiO$_2$ | SiO$_2$ | |
| A2-12 | | 16.55 | 18.00 | 0.05 | 0.33 | | 63.56 | | 16.37 | 24.76 | 0.02 | 0.18 | | 58.67 | 17.34 |
| A2-30 | | 16.06 | 18.21 | 0.00 | 0.40 | | 63.68 | | 15.89 | 25.07 | 0.00 | 0.22 | | 58.82 | 17.64 |
| A2-23 | | 18.59 | 18.78 | 0.05 | 0.48 | | 60.20 | | 18.37 | 25.82 | 0.02 | 0.26 | | 55.53 | 11.06 |
| 71 | | 24.04 | 19.66 | 0.00 | 0.20 | | 54.68 | | 23.44 | 26.67 | 0.00 | 0.11 | | 49.77 | −0.45 |
| A2-19 | | 18.48 | 19.74 | 0.00 | 0.54 | | 58.71 | | 18.29 | 27.18 | 0.00 | 0.29 | | 54.24 | 8.47 |
| A2-21 | | 13.74 | 19.98 | 0.13 | 0.34 | | 64.16 | | 13.51 | 27.34 | 0.06 | 0.18 | | 58.90 | 17.81 |
| Unifrax comp 13 | 13.10 | 0.77 | 16.90 | 34.10 | 0.97 | | 46.40 | | 0.92 | 28.11 | 18.55 | 0.64 | | 51.78 | 3.56 |
| A2-24 | | 13.62 | 22.74 | 0.08 | 0.31 | | 61.38 | | 13.25 | 30.79 | 0.04 | 0.17 | | 55.76 | 11.51 |
| Manville105 | | 9.74 | 23.10 | | 2.15 | | 65.10 | | 9.38 | 30.95 | 0.00 | 1.14 | 0.00 | 58.53 | 17.05 |
| Manville79 | | 8.67 | 24.00 | | 0.02 | | 67.20 | | 8.27 | 31.86 | 0.00 | 0.01 | 0.00 | 59.86 | 19.71 |
| A2-25 | | 10.99 | 24.18 | 0.07 | 0.33 | | 62.36 | | 10.66 | 32.64 | 0.03 | 0.18 | | 56.48 | 12.97 |
| Unifrax comp 14 | 23.40 | 0.89 | 21.70 | 24.10 | 0.90 | | 51.90 | | 0.98 | 33.18 | 12.05 | 0.54 | | 53.24 | 6.49 |
| A2-35 | | 8.88 | 24.88 | 0.47 | 0.29 | | 64.12 | | 8.56 | 33.37 | 0.21 | 0.15 | | 57.71 | 15.41 |
| Manville78 | | 6.43 | 26.50 | | | | 67.10 | | 6.07 | 34.80 | 0.00 | 0.00 | 0.00 | 59.13 | 18.25 |
| A2-34 | | 6.63 | 26.20 | 0.80 | 0.23 | | 64.85 | | 6.37 | 35.01 | 0.35 | 0.12 | | 58.15 | 16.29 |
| Unifrax comp 15 | 25.00 | 0.77 | 25.50 | 16.90 | 0.76 | | 55.70 | | 0.80 | 36.82 | 7.98 | 0.43 | | 53.96 | 7.93 |
| Manville77 | | 4.02 | 28.70 | | 0.59 | | 66.10 | | 3.79 | 37.68 | 0.00 | 0.31 | 0.00 | 58.22 | 16.44 |
| Unifrax 42 | 2.00 | 0.30 | 29.75 | 0.58 | 0.62 | | 68.63 | | 0.28 | 38.92 | 0.25 | 0.32 | | 60.23 | 20.47 |
| Manville106 | | 2.70 | 29.70 | | 1.56 | | 65.60 | | 2.54 | 38.94 | 0.00 | 0.81 | 0.00 | 57.71 | 15.41 |
| Manville80 | | 1.60 | 30.10 | | | | 68.40 | | 1.49 | 39.02 | 0.00 | 0.00 | 0.00 | 59.49 | 18.98 |
| Manville71 | | 3.12 | 30.10 | | 1.15 | | 65.40 | | 2.92 | 39.26 | 0.00 | 0.59 | 0.00 | 57.23 | 14.45 |
| Manville76 | | 3.12 | 30.10 | | 1.15 | | 65.40 | | 2.92 | 39.26 | 0.00 | 0.59 | 0.00 | 57.23 | 14.45 |
| Unifrax 47 | 7.70 | 0.25 | 30.26 | 0.01 | 1.86 | | 67.53 | | 0.23 | 39.56 | 0.00 | 0.96 | | 59.24 | 18.48 |
| Unifrax 40 | 9.20 | 0.27 | 30.57 | 0.58 | 0.92 | | 67.52 | | 0.25 | 39.90 | 0.25 | 0.47 | | 59.13 | 18.25 |
| 765 | | 3.90 | 35.07 | 0.00 | 2.12 | | 57.78 | | 3.62 | 45.26 | 0.00 | 1.08 | | 50.04 | 0.07 |

It can be seen that the fibres according to the present invention show lower shrinkage at 1260° C. than do the exacted fibres other than fibre Unifrax 42 which has a radically different composition.

Figure 2:
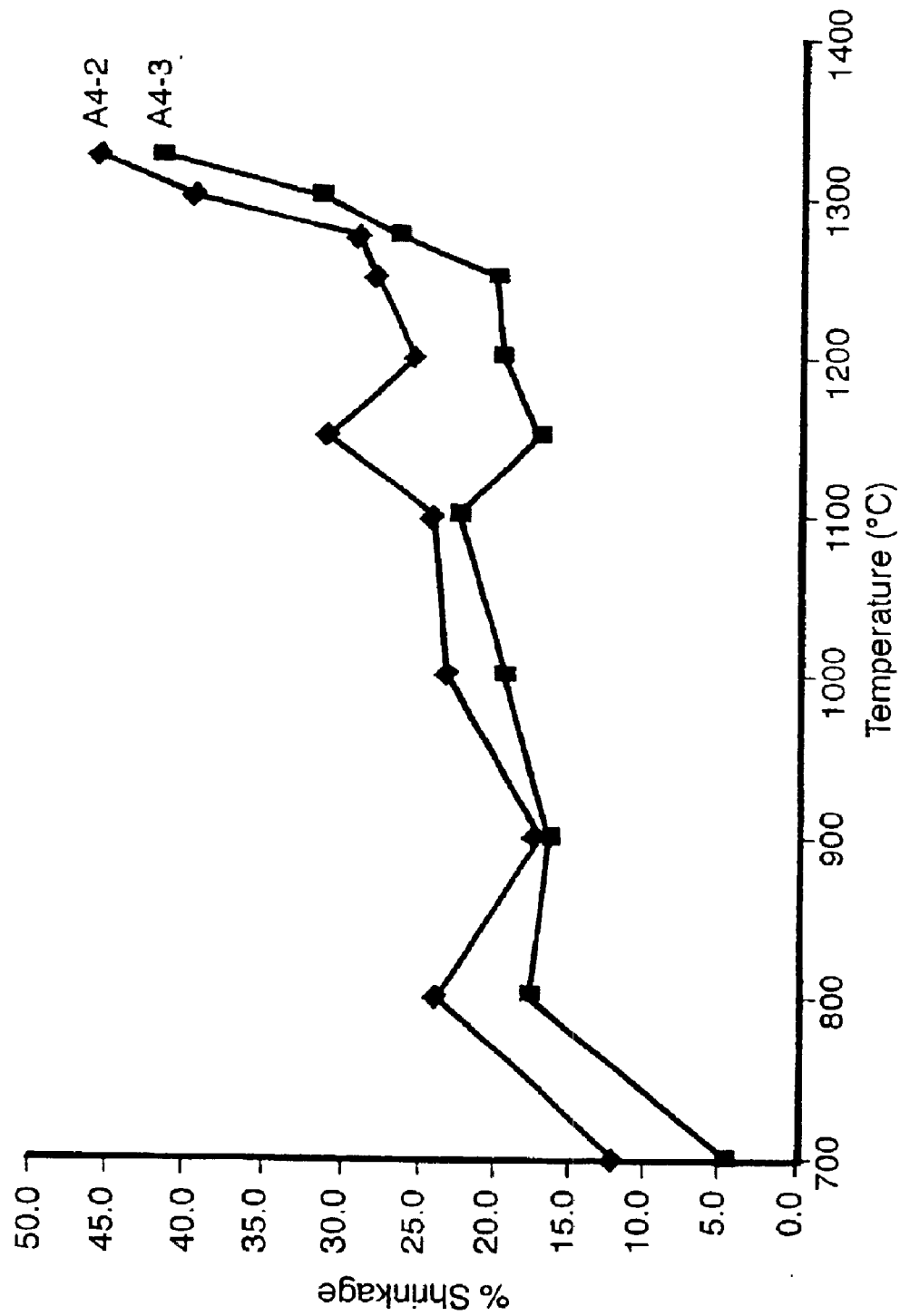
FIG. 2 is a graph showing shrinkage through the height of blankets comprising the fibres A4-2 and A4-3 of Table 1 below.
Figure 3:
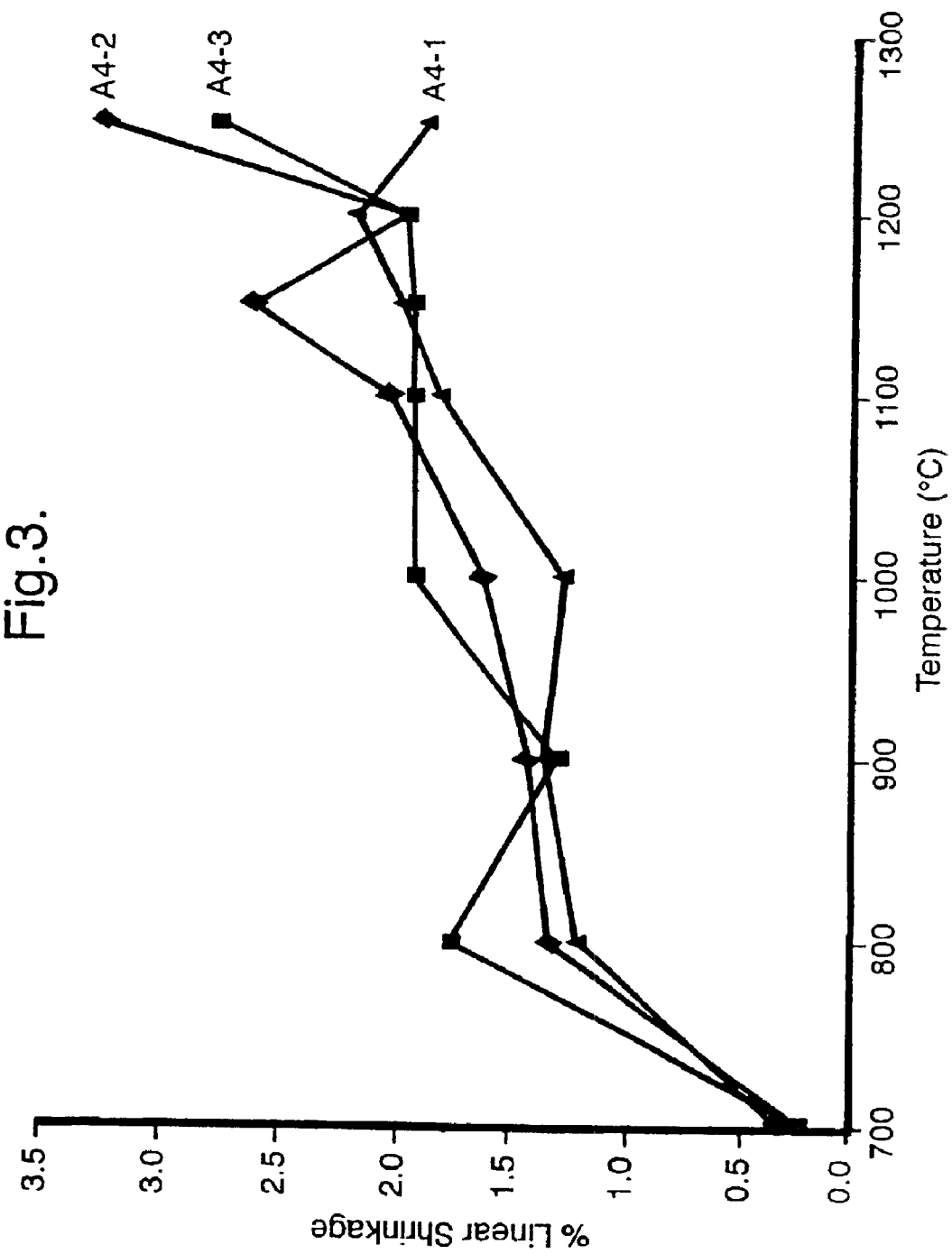
FIG. 3 is a graph showing shrinkage of preforms produced from fibres A4-1, A4-2 and A4-3 of Table 1 below.

In FIGS. 1–3, graphs show the shrinkage characteristics of the fibres A4-1, A4-2, and A4-3 after 24 hours exposure to the indicated temperatures it can be seen that the fibres are readily usable at temperatures of 1200° C. or more.

Table 2 below shows the results of solubility tests on the fibres in physiological saline solution indicating that the fibres are soluble in body fluids. (See WO94/15883 for a discussion of methods of measuring solubility). Pairs of results are indicated for separate tests on each sample as is a mean total solubility.

TABLE 2

| Fibre type | Solubility (ppm) | | | | |
|---|---|---|---|---|---|
| | CaO | MgO | SiO$_2$ | Total | Mean Total |
| A4-1 | 102 | 115 | 171 | 388 | 383 |
| | 105 | 110 | 162 | 377 | |
| A4-2 | 105 | 116 | 172 | 393 | 395 |
| | 114 | 117 | 166 | 397 | |
| A4-3 | 114 | 123 | 166 | 403 | 411 |
| | 114 | 128 | 177 | 419 | |

A typical range of compositions for fibres of the present invention would be

SiO$_2$ 65±0.5 wt %
CaO 20±0.5 wt %
MgO 15±0.5 wt %

Further tests were made on fibres having the inventive composition of SiO$_2$ 65%, CaO 19.5%, MgO 15.5% in comparison with Superwool 607™, a fibre having the nominal composition (by weight) of SiO$_2$ 65%, CaO 29.5%, MgO 5.5%, and Al$_2$O$_3$<1%; Superwool 612™, a fibre having the nominal composition (by weight) of SiO$_2$ 64.5%, CaO 17%, MgO 13.5%, ZrO$_2$ 5%; and refractory ceramic fibre having the nominal composition SiO$_2$ 56%, Al$_2$O$_3$ 44%.

The first test was aimed at indicating the amount of dust that might be released on handling. The test comprised the determination of the amount of dust present in a sample of blanket made from the respective fibres. The samples of blanket were vibrated on a Fritsch Analysette type 3010 vibratory sieve shaker, which was set for a frequency of 3000 Hz and vertical amplitude of 0.5 m The apparatus was equipped with a 1.6 nm sieve and a pan. In the test method a sample of blanket 135 min×135 mm was placed on the sieve and vibrated for 10 minutes. The material collected in the pan was weighed and expressed as a percentage of the original weight of the sample. The results were as indicated below:—

| Fibre Material | Percent dust released |
|---|---|
| Superwool 607 ™ | 0.16% |
| Inventive material | 0.18% |
| Refractory ceramic fibre | 0.25% |
| Superwool 612 ™ | 0.36% |

From this it can be se that the inventive fibre is of comparable low dustiness to Superwool 607™.

The second test made was to look to the shrinkage behaviour of blanket formed from the inventive fibre and the two Superwool™ fibres at high temperatures. Samples of blanket were exposed to specified temperatures for 24 hour periods and their linear shrinkage measured. The results are indicated in Table 3 below.—

TABLE 3

| Sample | Temperature | | | | | |
|---|---|---|---|---|---|---|
| | 1050° C. | 1110° C. | 1150° C. | 1200° C. | 1250° C. | 1300° C. |
| Inventive fibre | 0.8 | 0.6 | 1.0 | 1.0 | 1.5 | 4.2 |
| Superwool 612 ™ | 0.7 | 1.0 | 1.1 | 1.7 | 1.8 | 12.1 |
| Superwool 607 ™ | 0.4 | 0.4 | 0.5 | 0.6 | 4.8 | 7.8 |

This shows that the inventive fibre is comparable in performance with both Superwool™ fibres up to 1200° C. At 1250° C. the Superwool 607™ fibre shows a shrinkage of 4.8% (which would be considered as too high a shrinkage for most applications). At 1300° C. the inventive fibre while still showing a high shrinkage of 4.2% is the best of the three fibres tested.

A further series of tests were made to produce fibres on a production scale and the compositions of fibres obtained were as set out in Table 4 below. All showed low shrinkage at 1250° C. (shrinkages were measured by different methods to Table 1 and are not directly comparable). In combination with the results of Table 1, this shows samples of usable characteristics having compositions consisting essentially of (in wt %):—

| | |
|---|---|
| CaO | 18.7 to 20.2 |
| MgO | 14.47 to 15.9 |
| $SiO_2$ | 64.5 to 65.1 |
| $Al_2O_3$ | 0 to 0.56 |

The fibres of the present invention therefore have a high solubility (desired to permit fibres to be cleared from the body quickly); a low dustiness (desired to reduce the amount of fibre that can be inhaled), and good high temperature characterstics.

What is claimed is:

1. A fibre having a maximum use temperature of 1200° C. or more which comprises:—

$SiO_2$>64.25 wt %

CaO>18 wt %

MgO<17 wt % and in which the amount of MgO in mol % is greater than the amount of CaO in mol % and in which the $SiO_2$ excess as specified is no greater than 21.8 mol %.

2. A fibre as claimed in claim 1 and comprising:—

CaO<21 wt %.

3. A fibre as claimed in claim 2 and comprising:—

CaO<20.5 wt %.

4. A fibre as claimed in claim 1 and comprising:—

CaO>19 wt %.

5. A fibre as claimed in claim 4 and comprising:—

CaO>19.5 wt %.

6. A fibre as claimed in claim 1 and comprising:—

MgO>14.25 wt %.

7. A fibre as claimed in claim 6 and comprising:—

MgO>14.75 wt %.

8. A fibre as claimed in claim 7 and comprising:—

MgO>15.25 wt %.

9. A fibre as claimed in claim 1 and comprising:—

MgO<16 wt %.

10. A fibre as claimed in claim 1 and comprising:—

$SiO_2$ 65+/−0.5 wt %

CaO 20+/−0.5 wt %

MgO 15+/−0.5 wt %.

11. A fibre as claimed in claim 1 and comprising:—

$SiO_2$ 64.5–64.7 wt %

CaO 19.5–20.2 wt %

MgO 15.5–15.6 wt %.

TABLE 4

| Fibre | Linear shrinkage (%) at 1250° C. | Composition wt % | | | | | | | Composition wt % | | | | | | $SiO_2$ Excess |
|---|---|---|---|---|---|---|---|---|---|---|---|---|---|---|---|
| | | CaO | MgO | $ZrO_2$ | $Al_2O_3$ | $TiO_2$ | $SiO_2$ | Others | CaO | MgO | $ZrO_2$ | $Al_2O_3$ | $TiO_2$ | $SiO_2$ | |
| SM | 0.80 | 20.10 | 15.00 | | 0.06 | | 65.00 | | 19.77 | 20.52 | 0.00 | 0.03 | | 59.67 | 19.35 |
| TCI | 0.78 | 18.90 | 15.50 | | 0.38 | | 65.10 | | 18.63 | 21.26 | 0.00 | 0.21 | | 59.90 | 19.81 |
| TCUK | no preform made | 18.70 | 15.90 | | 0.44 | | 64.80 | | 18.41 | 21.78 | 0.00 | 0.24 | | 59.56 | 19.13 |
| TCUK2 | 2.6 (measured at 1300° C.) | 19.30 | 14.47 | | 0.56 | 0.03 | 64.54 | 0.40 | 19.30 | 20.13 | 0.00 | 0.31 | | 60.24 | 20.50 |

12. A fibre as claimed in claim 1 and comprising:—

$SiO_2$ about 65 wt %

CaO about 19.5 wt %

MgO about 15.5 wt %.

13. A fibre as claimed in claim 1 and consisting essentially of:—

CaO 18.7 to 20.2 wt %

MgO 14.47 to 15.9 wt %

$SiO_2$ 64.5 to 65.1 wt %

$Al_2O_3$ 0 to 0.56 wt %.

* * * * *